(12) United States Patent
Hall et al.

(10) Patent No.: US 10,491,877 B1
(45) Date of Patent: Nov. 26, 2019

(54) DEPTH CAMERA ASSEMBLY USING MULTIPLEXED SENSOR PHASE MEASUREMENTS TO DETERMINE DEPTH USING FRINGE INTERFEROMETRY

(71) Applicant: Facebook Technologies, LLC, Menlo Park, CA (US)

(72) Inventors: Michael Hall, Seattle, WA (US); Qing Chao, Redmond, WA (US); Xinqiao Liu, Medina, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/849,795

(22) Filed: Dec. 21, 2017

(51) Int. Cl.
*H04N 13/128* (2018.01)
*H04N 5/225* (2006.01)
*G09G 3/22* (2006.01)
*G02B 27/01* (2006.01)

(52) U.S. Cl.
CPC ....... *H04N 13/128* (2018.05); *G02B 27/0172* (2013.01); *G09G 3/22* (2013.01); *H04N 5/2253* (2013.01)

(58) Field of Classification Search
CPC .. H04N 13/128; H04N 13/271; H04N 5/2253; H04N 5/372; H04N 5/374; H04N 5/3741; H04N 5/3745; H04N 5/37452; G02B 27/0172; G09G 3/22; H01L 27/14601; H01L 27/14609; H01L 27/14643; H01L 27/1461
See application file for complete search history.

(56) References Cited

U.S. PATENT DOCUMENTS

| 8,773,562 | B1 * | 7/2014 | Fan | H01L 27/14643 348/308 |
| 9,293,503 | B2 * | 3/2016 | Sakano | H01L 27/14609 |
| 2009/0278174 | A1 * | 11/2009 | Ichikawa | H01L 27/14609 257/222 |
| 2013/0026384 | A1 * | 1/2013 | Kim | G01S 17/89 250/393 |
| 2014/0246568 | A1 * | 9/2014 | Wan | H01L 27/1461 250/214.1 |
| 2015/0350582 | A1 * | 12/2015 | Korobov | H04N 5/37452 348/302 |
| 2016/0181295 | A1 * | 6/2016 | Wan | G01S 7/4914 348/164 |
| 2016/0181298 | A1 * | 6/2016 | Wan | H01L 27/1465 348/164 |
| 2017/0134717 | A1 * | 5/2017 | Trail | G06T 19/006 |
| 2017/0180703 | A1 * | 6/2017 | Kovacovsky | G01S 17/46 |
| 2017/0180713 | A1 * | 6/2017 | Trail | G06F 3/011 |
| 2017/0191822 | A1 * | 7/2017 | Becker | H05K 999/99 |

(Continued)

*Primary Examiner* — Tom V Sheng
(74) *Attorney, Agent, or Firm* — Fenwick & West LLP

(57) ABSTRACT

A depth camera assembly (DCA) determines distances between the DCA and objects in a local area within a field of view of the DCA. The DCA projects a series of sinusoidal patterns into the local area DCA and captures images of the sinusoidal patterns via a sensor. Each pixel of the augmented sensor includes a plurality of charge bins, and charge accumulated by a photodiode of a pixel during different time intervals (e.g., times when different sinusoidal patterns are emitted) is stored in a different charge storage bin. Charge may be retrieved from different charge storage bins to determine depth from the DCA.

19 Claims, 6 Drawing Sheets

(56) References Cited

U.S. PATENT DOCUMENTS

| | | | |
|---|---|---|---|
| 2017/0206660 A1* | 7/2017 | Trail | G06T 7/521 |
| 2017/0280080 A1* | 9/2017 | Machida | H01L 27/14 |
| 2018/0167606 A1* | 6/2018 | Cazaux | G01S 7/4914 |
| 2018/0176498 A1* | 6/2018 | Elkhatib | H04N 5/37452 |
| 2018/0196509 A1* | 7/2018 | Trail | G06F 1/163 |
| 2018/0213165 A1* | 7/2018 | Sekita | H04N 5/3452 |
| 2018/0288343 A1* | 10/2018 | McCarten | H04N 5/35581 |
| 2018/0294304 A1* | 10/2018 | Janssens | H01L 27/14643 |
| 2018/0294305 A1* | 10/2018 | Janssens | H01L 27/14643 |
| 2018/0295306 A1* | 10/2018 | Cremers | H04N 5/378 |
| 2018/0315784 A1* | 11/2018 | Saxod | H01L 27/14609 |
| 2018/0376090 A1* | 12/2018 | Liu | G01J 1/44 |

\* cited by examiner

DEPTH CAMERA ASSEMBLY USING MULTIPLEXED SENSOR PHASE MEASUREMENTS TO DETERMINE DEPTH USING FRINGE INTERFEROMETRY

BACKGROUND

The present disclosure generally relates to virtual or augmented reality systems and more specifically relates to headsets for virtual reality systems that obtain depth information of a local area.

Providing virtual reality (VR) or augmented reality (AR) content to users through a head mounted display (HMD) often relies on localizing a user's position in an arbitrary environment and determining a three dimensional mapping of the surroundings within the arbitrary environment. The user's surroundings within the arbitrary environment may then be represented in a virtual environment or the user's surroundings may be overlaid with additional content.

Conventional HMDs include one or more quantitative depth cameras to determine surroundings of a user within the user's environment. Typically, conventional depth cameras use structured light or time of flight to determine the HMD's location within an environment. Structured light depth cameras use an active illumination source to project known patterns into the environment surrounding the HMD. However, structured light commonly requires a pattern that is projected to be configured so different portions of the pattern include different characteristics that are later identified. Having different characteristics of different portions of the pattern causes signification portions of a resulting image of the projected pattern to not be illuminated. This inefficiently uses a sensor capturing the resulting image; for example, projection of the pattern by a structured light depth camera results in less than 10% of sensor pixels collecting light from the projected pattern, while requiring multiple sensor pixels to be illuminated to perform a single depth measurement.

Time of flight depth cameras measure a round trip travel time of light projected into the environment surrounding a depth camera and returning to pixels on a sensor array. While time of flight depth cameras are capable of measure depths of different objects in the environment independently via each sensor pixel, light incident on a sensor pixel may be a combination of light received from multiple optical paths in the environment surrounding the depth camera. Existing techniques to resolve the optical paths of light incident on a sensor pixels are computationally complex and do not fully disambiguate between optical paths in the environment.

SUMMARY

A headset in a virtual reality (VR) or augmented reality (AR) system environment includes a depth camera assembly (DCA) configured to determine distances between a head mounted display (HMD) and one or more objects in an area surrounding the HMD and within a field of view of an imaging device included in the headset (i.e., a "local area"). The DCA includes the imaging device, such as a camera, and an illumination source that is displaced by a specific distance relative to the illumination source. The illumination source is configured to emit a series of periodic illumination patterns (e.g., a sinusoid) into the local area. Each periodic illumination pattern of the series is phase shifted by a different amount. The periodicity of the illumination pattern is a spatial periodicity observed on an object illuminated by the illumination pattern, and the phase shifts are lateral spatial phase shifts along the direction of periodicity. In various embodiments, the periodicity of the illumination pattern is in a direction that is parallel to a displacement between the illumination source and a center of the imaging device of the DCA.

The imaging device captures frames including the periodic illumination patterns via a sensor including multiple pixels and coupled to a processor. For each pixel of the sensor, the processor relates intensities captured by a pixel in multiple images to a phase shift of a periodic illumination pattern captured by the multiple images. From the phase shift of the periodic illumination pattern captured by the pixel, the processor determines a depth of a location within the local area from which the pixel captured the intensities of the periodic illumination pattern from the HMD. Each pixel of the sensor may independently determine a depth based on captured intensities of the periodic illumination pattern, optimally using the pixels of the sensor of the DCA.

In various embodiments, each pixel of the sensor comprises a photodiode coupled to multiple charge accumulation bins by transfer gates. For example, a pixel of the sensor includes a photodiode coupled to three charge accumulation bins, with a different transfer gate coupling the photodiode to different charge accumulation bins. At different times, the pixel receives a control signal opening a specific transfer gate, while other transfer gates remain closed. Charge accumulated by the photodiode of the pixel is accumulated in the charge accumulation bin via the opened specific transfer gate. Subsequently, the specific transfer gate is closed and charge is accumulated by the photodiode. A subsequent control signal received by the pixel opens another transfer gate at a different time, so charge accumulated by the photodiode is accumulated in another charge accumulation bin through the other transfer gate. Hence, different charge accumulation bins store charge accumulated by the sensor at different times. Charge accumulated in different charge accumulation bins is retrieved and used to determine depth of a location in the local area from which the pixel captured intensity of light.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
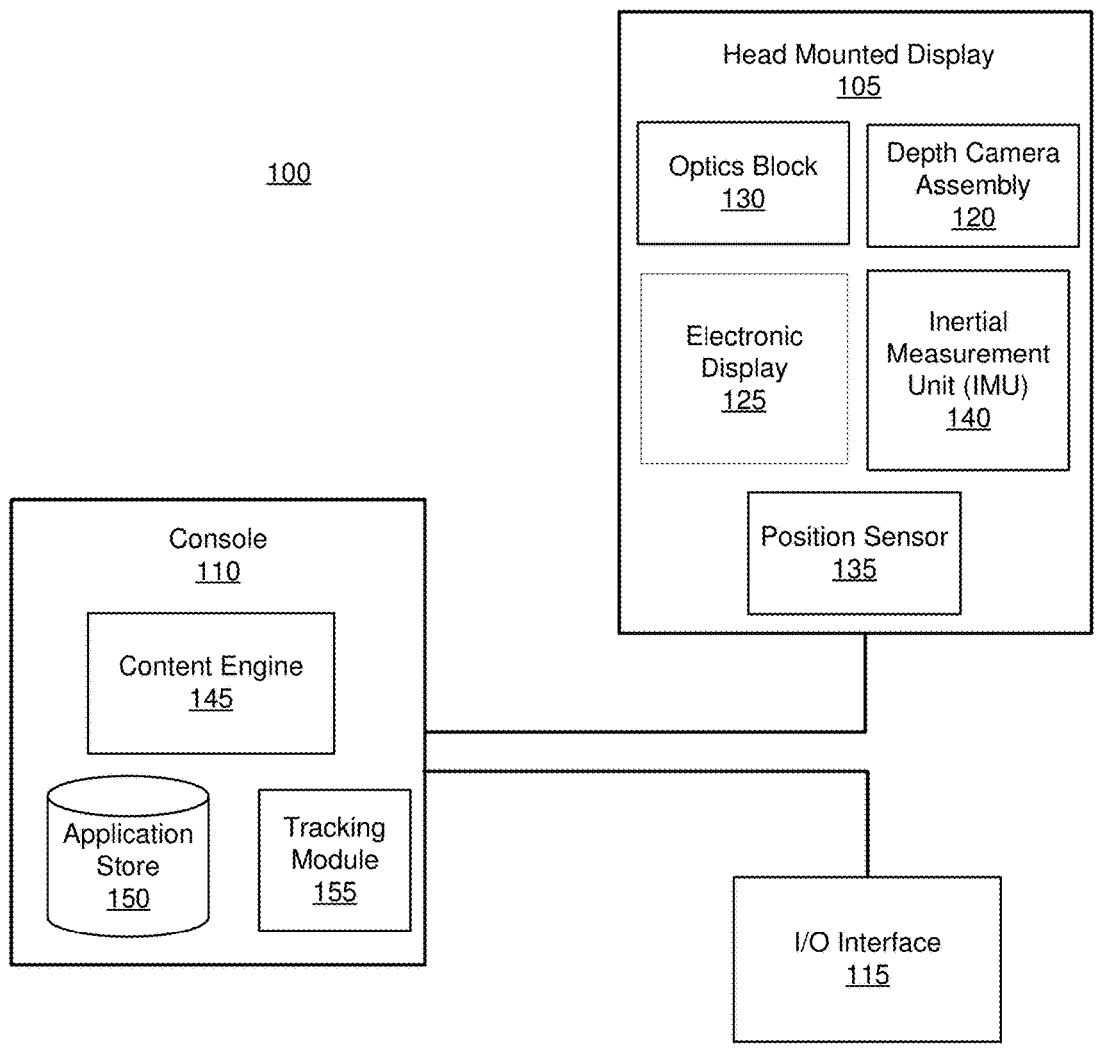
FIG. 1 is a block diagram of a system environment for providing virtual reality or augmented reality content, in accordance with an embodiment.

FIG. 1 is a block diagram of one embodiment of a system environment 100 in which a console 110 operates. The system environment 100 shown in FIG. 1 may provide augmented reality (AR) or virtual reality (VR) content to users in various embodiments. Additionally or alternatively, the system environment 100 generates one or more virtual environments and presents a virtual environment with which a user may interact to the user. The system environment 100 shown by FIG. 1 comprises a head mounted display (HMD) 105 and an input/output (I/O) interface 115 that is coupled to a console 110. While FIG. 1 shows an example system environment 100 including one HMD 105 and one I/O interface 115, in other embodiments any number of these components may be included in the system environment 100. For example, there may be multiple HMDs 105 each having an associated I/O interface 115, with each HMD 105 and I/O interface 115 communicating with the console 110. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The head mounted display (HMD) 105 presents content to a user comprising augmented views of a physical, real-world environment with computer-generated elements (e.g., two dimensional (2D) or three dimensional (3D) images, 2D or 3D video, sound, etc.) or presents content comprising a virtual environment. In some embodiments, the presented content includes audio that is presented via an external device (e.g., speakers and/or headphones) that receives audio information from the HMD 105, the console 110, or both, and presents audio data based on the audio information. An embodiment of the HMD 105 is further described below in conjunction with FIGS. 2 and 3. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The HMD 105 includes a depth camera assembly (DCA) 120, an electronic display 125, an optics block 130, one or more position sensors 135, and an inertial measurement unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments.

The DCA 120 captures data describing depth information of an area surrounding the HMD 105. Some embodiments of the DCA 120 include one or more imaging devices (e.g., a camera, a video camera) and an illumination source configured to emit a series of periodic illumination patterns, with each periodic illumination pattern phase shifted by a different amount. As another example, the illumination source emits a series of sinusoids that each have a specific spatial phase shift. The periodicity of the illumination pattern is a spatial periodicity observed on an object illuminated by the illumination pattern, and the phase shifts are lateral spatial phase shifts along the direction of periodicity. In various embodiments, the periodicity of the illumination pattern is in a direction that is parallel to a displacement between the illumination source and a center of the imaging device of the DCA 120

Figure 4:
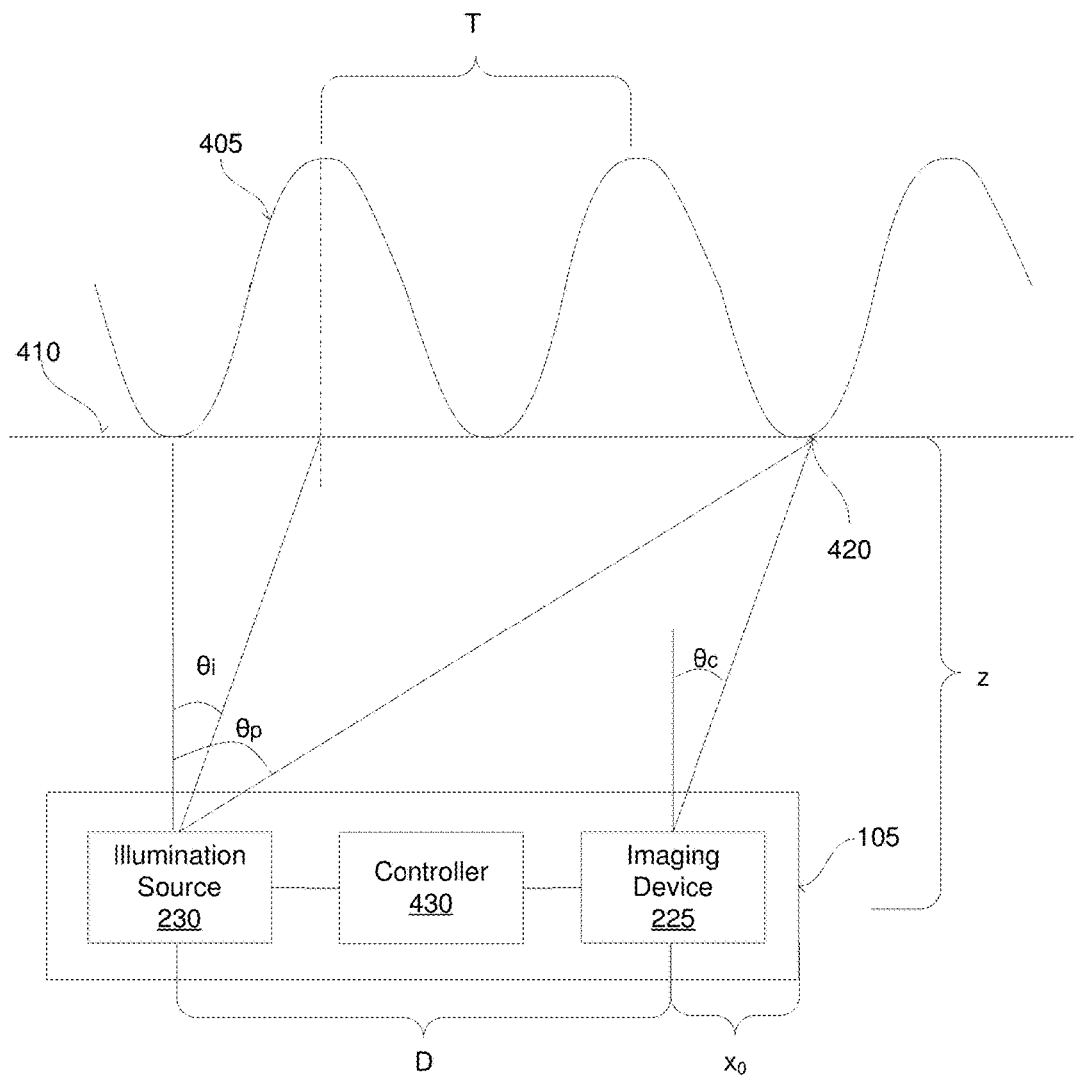
FIG. 4 is an example of light emitted into a local area and captured by a depth camera assembly, in accordance with an embodiment.
Figure 5:
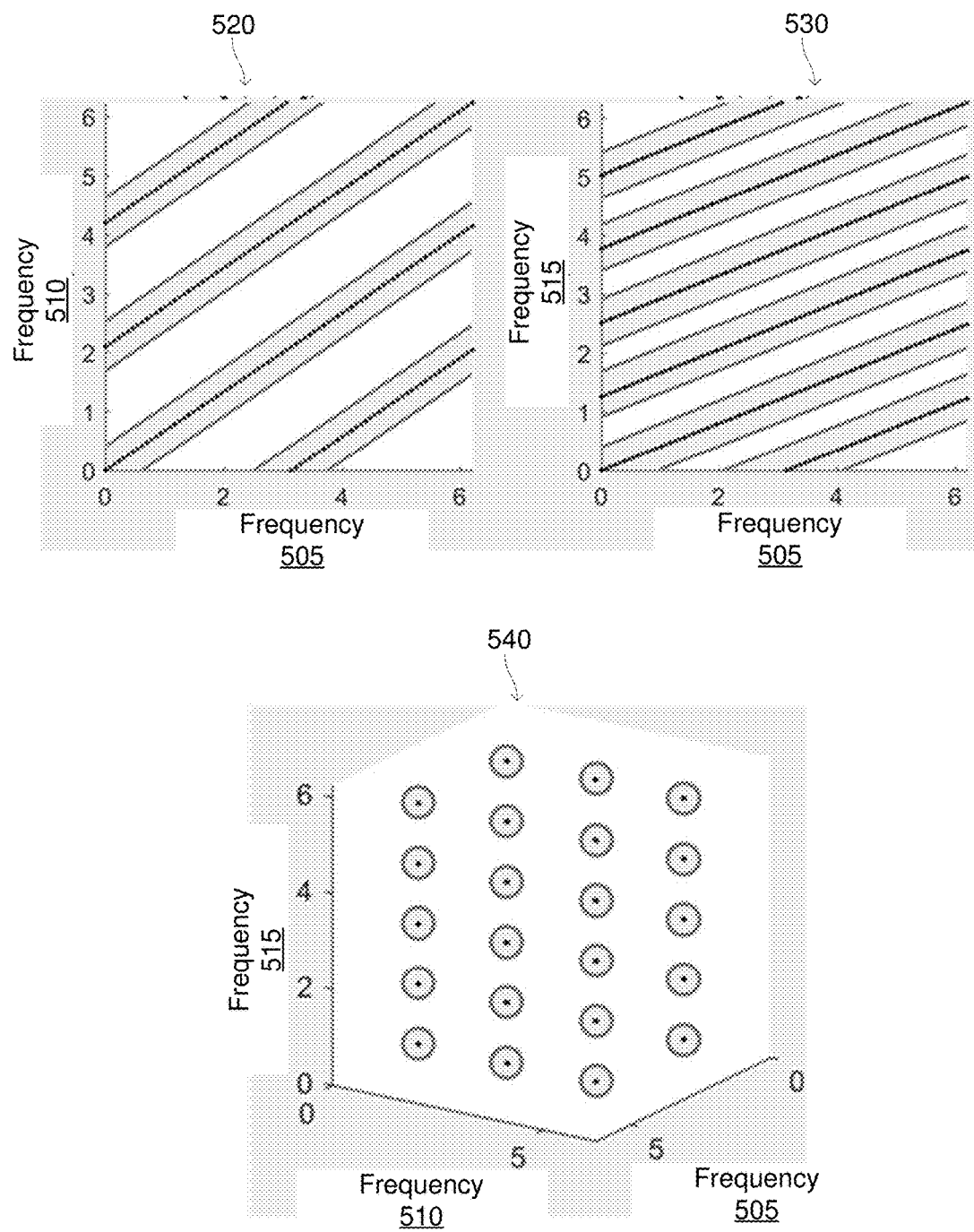
FIG. 5 is an example of using multiple frequencies of a continuous intensity pattern of light emitted by a DCA to identify a phase shift for a pixel of the sensor, in accordance with an embodiment.

For example, the illumination source emits a series of sinusoids that each have a different spatial phase shift into an environment surrounding the HMD 105. In other examples, the illumination source emits a sinusoidal pattern multiplied by a low frequency envelope, such as a Gaussian, which changes relative signal intensity over the field of view of the imaging device. This change in relative signal intensity over the imaging device's field of view changes temporal noise characteristics without affecting the depth determination, which is further described below in conjunction with FIGS. 4 and 5 provided the higher frequency signal is a sinusoid. The imaging device of the DCA 120 includes a sensor comprising multiple pixels that determine a phase shift of a periodic illumination pattern included in multiple images captured by the imaging device based on relative intensities included in the multiple captured images. As the phase shift is a function of depth, the DCA 120 determines a depth of a location within the local area from which images of the periodic illumination from the determined phase shift, as further described below in conjunction with FIGS. 4 and 5. In various embodiments, each pixel of the sensor of the imaging device determines a depth of a location within the local area from which a pixel captured intensities of the periodic illumination pattern based on a phase shift determined for the periodic illumination pattern captured by the pixel.

The imaging device captures and records particular ranges of wavelengths of light (i.e., "bands" of light). Example bands of light captured by an imaging device include: a visible band (~380 nm to 750 nm), an infrared (IR) band (~750 nm to 2,200 nm), an ultraviolet band (100 nm to 380 nm), another portion of the electromagnetic spectrum, or some combination thereof. In some embodiments, an imaging device captures images including light in the visible band and in the infrared band.

The electronic display 125 displays 2D or 3D images to the user in accordance with data received from the console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the HMD 105. In various embodiments, the optics block 130 includes one or more optical elements. Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The I/O interface 115 is a device that allows a user to send action requests and receive responses from the console 110. An action request is a request to perform a particular action. For example, an action request may be an instruction to start or end capture of image or video data or an instruction to perform a particular action within an application. The I/O interface 115 may include one or more input devices. Example input devices include: a keyboard, a mouse, a game controller, or any other suitable device for receiving action requests and communicating the action requests to the console 110. An action request received by the I/O interface 115 is communicated to the console 110, which performs an action corresponding to the action request. In some embodiments, the I/O interface 115 includes an IMU 140, as further described above, that captures calibration data indicating an estimated position of the I/O interface 115 relative to an initial position of the I/O interface 115. In some embodiments, the I/O interface 115 may provide haptic feedback to the user in accordance with instructions received from the console 110. For example, haptic feedback is provided when an action request is received, or the console 110 communicates instructions to the I/O interface 115 causing the I/O interface 115 to generate haptic feedback when the console 110 performs an action.

The console 110 provides content to the HMD 105 for processing in accordance with information received from one or more of: the DCA 120, the HMD 105, and the VR I/O interface 115. In the example shown in FIG. 1, the console 110 includes an application store 150, a tracking module 155 and a content engine 145. Some embodiments of the console 110 have different modules or components than those described in conjunction with FIG. 1. Similarly, the functions further described below may be distributed among components of the console 110 in a different manner than described in conjunction with FIG. 1.

The application store 150 stores one or more applications for execution by the console 110. An application is a group of instructions, that when executed by a processor, generates content for presentation to the user. Content generated by an application may be in response to inputs received from the user via movement of the HMD 105 or the I/O interface 115. Examples of applications include: gaming applications, conferencing applications, video playback applications, or other suitable applications.

The tracking module 155 calibrates the system environment 100 using one or more calibration parameters and may adjust one or more calibration parameters to reduce error in determination of the position of the HMD 105 or of the I/O interface 115. For example, the tracking module 155 communicates a calibration parameter to the DCA 120 to adjust the focus of the DCA 120 to more accurately determine depths of locations within the local area surrounding the HMD 105 from captured intensities. Calibration performed by the tracking module 155 also accounts for information received from the IMU 140 in the HMD 105 and/or an IMU 140 included in the I/O interface 115. Additionally, if tracking of the HMD 105 is lost (e.g., the DCA 120 loses line of sight of at least a threshold number of SL elements), the tracking module 140 may re-calibrate some or all of the system environment 100.

The tracking module 155 tracks movements of the HMD 105 or of the I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the I/O interface 115 using data indicating a position of the HMD 105 from the IMU 140 or using data indicating a position of the I/O interface 115 from an IMU 140 included in the I/O interface 115, respectively. Additionally, in some embodiments, the tracking module 155 may use portions of data indicating a position of the HMD 105 from the IMU 140 as well as representations of the local area from the DCA 120 to predict a future location of the HMD 105. The tracking module 155 provides the estimated or predicted future position of the HMD 105 or the I/O interface 115 to the content engine 145.

The content engine 145 generates a 3D mapping of the area surrounding the HMD 105 (i.e., the "local area") based on information received from the DCA 120 included in the HMD 105. In some embodiments, the content engine 145 determines depth information for the 3D mapping of the local area based on depths determined by each pixel of the sensor in the imaging device from a phase shift determined from relative intensities captured by a pixel of the sensor in multiple images. In various embodiments, the content engine 145 uses different types of information determined by the DCA 120 or a combination of types of information determined by the DCA 120 to generate the 3D mapping of the local area.

The content engine 145 also executes applications within the system environment 100 and receives position information, acceleration information, velocity information, predicted future positions, or some combination thereof, of the HMD 105 from the tracking module 155. Based on the received information, the content engine 145 determines content to provide to the HMD 105 for presentation to the user. For example, if the received information indicates that the user has looked to the left, the content engine 145 generates content for the HMD 105 that mirrors the user's movement in a virtual environment or in an environment augmenting the local area with additional content. Additionally, the content engine 145 performs an action within an application executing on the console 110 in response to an action request received from the I/O interface 115 and provides feedback to the user that the action was performed. The provided feedback may be visual or audible feedback via the HMD 105 or haptic feedback via the I/O interface 115.

Head Mounted Display

Figure 2:
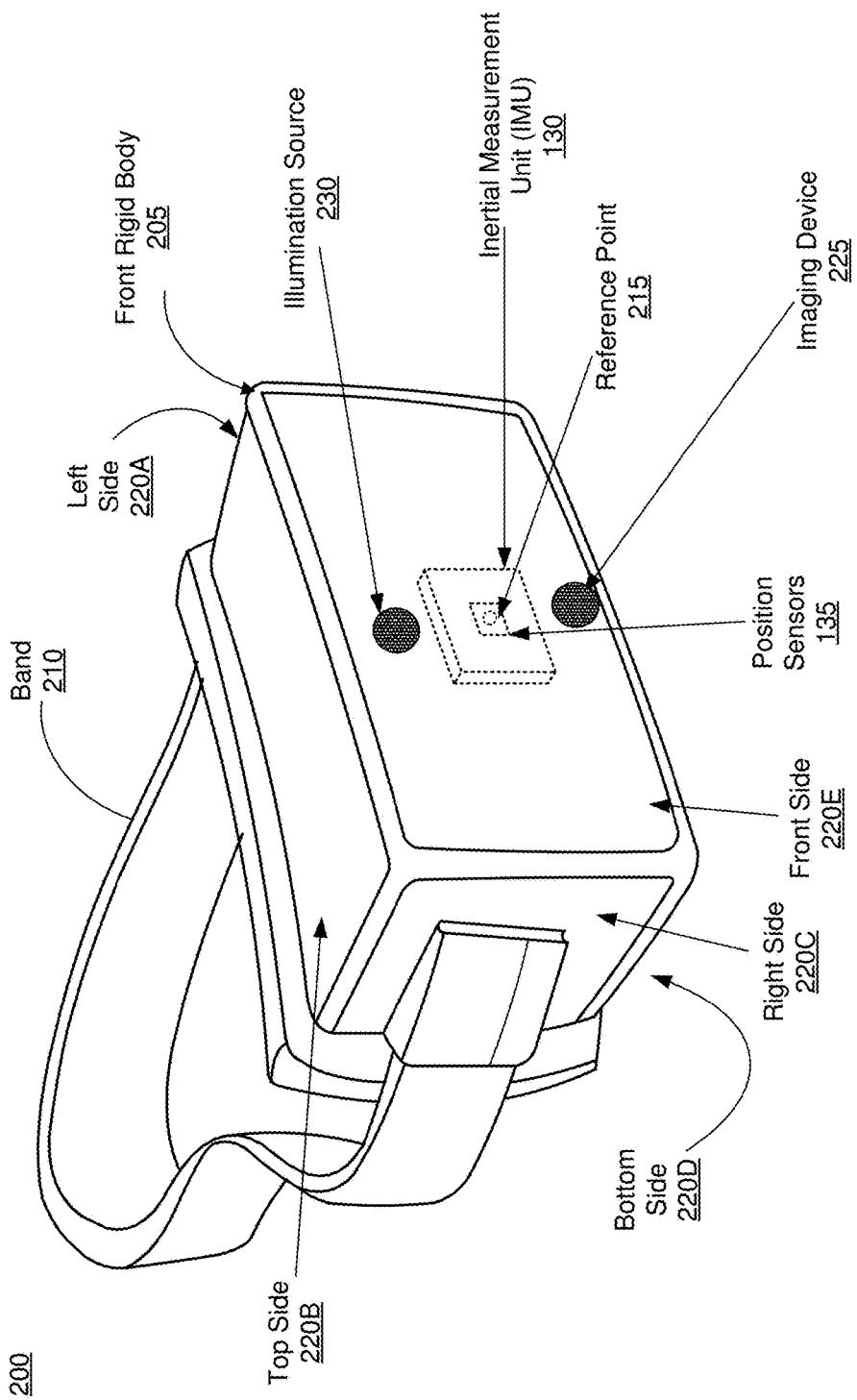
FIG. 2 is a diagram of a head mounted display (HMD), in accordance with an embodiment.

FIG. 2 is a wire diagram of one embodiment of a head mounted display (HMD) 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of a depth camera assembly (DCA) 120 including an imaging device 225 and an illumination source 230, which are further described below in conjunction with FIGS. 3 and 4. The front rigid body 205 includes one or more electronic display elements of the electronic display 125 (not shown), the IMU 130, the one or more position sensors 135, and the reference point 215.

In the embodiment shown by FIG. 2, the HMD 200 includes a DCA 120 comprising an illumination source 225, such as a camera, and an illumination source 230 configured to emit a series of periodic illumination patterns, with each periodic illumination pattern phase shifted by a different amount into a local area surrounding the HMD 200. In various embodiments, the illumination source 230 emits a sinusoidal pattern, a near sinusoidal pattern, or any other periodic pattern (e.g., a square wave). For example, the illumination source 230 emits a series of sinusoids that each have a different phase shift into an environment surrounding the HMD 200. In various embodiments, the illumination source 230 includes an acousto-optic modulator configured to generate two Gaussian beams of light that interfere with each other in the local area so a sinusoidal interference pattern is generated. However, in other embodiments the illumination source 230 includes one or more of an acousto-optic device, an electro-optic device, physical optics, optical interference, a diffractive optical device, or any other suitable components configured to generate the periodic illumination pattern. In some embodiments, the illumination source 230 includes additional optical elements that modify the generated sinusoidal interference pattern to be within an intensity envelope (e.g., within a Gaussian intensity pattern); alternatively, the HMD 200 includes the additional optical elements and the Gaussian beams of light generated by the illumination source 230 are directed through the additional optical elements before being emitted into the environment surrounding the HMD 200. The imaging device 225 captures images of the local area, which are used to calculate depths relative to the HMD 200 of various locations within the local area, as further described below in conjunction with FIGS. 3-5.

Figure 3:
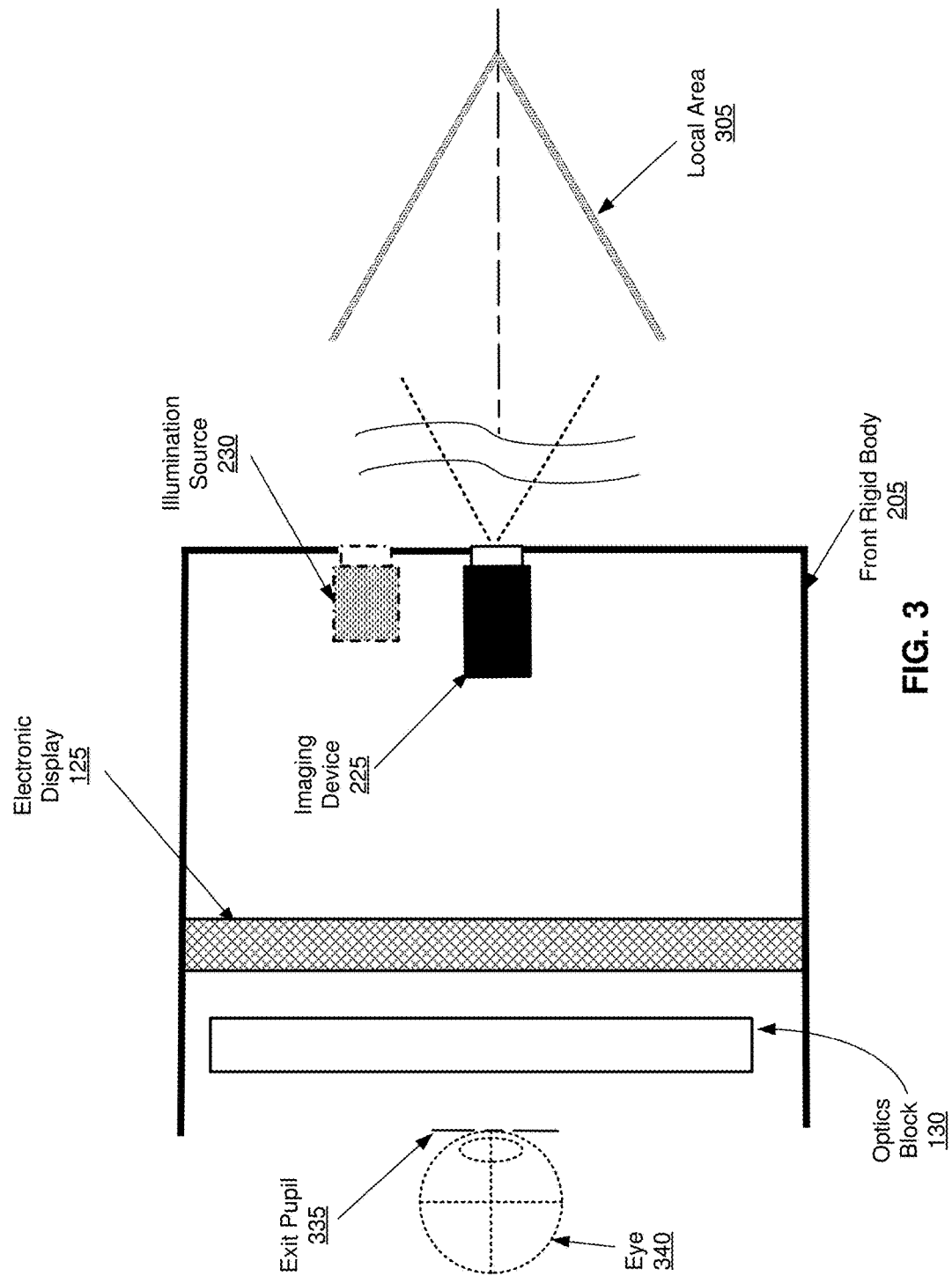
FIG. 3 is a cross section of a front rigid body of a head mounted display (HMD), in accordance with an embodiment.

FIG. 3 is a cross section of the front rigid body 205 of the HMD 200 depicted in FIG. 2. As shown in FIG. 3, the front rigid body 205 includes an imaging device 225 and an illumination source 230. The front rigid body 205 also has an optical axis corresponding to a path along which light propagates through the front rigid body 205. In some embodiments, the imaging device 225 is positioned along the optical axis and captures images of a local area 305, which is a portion of an environment surrounding the front rigid body 205 within a field of view of the imaging device 225. Additionally, the front rigid body 205 includes the electronic display 125 and the optics block 130, which are further described above in conjunction with FIG. 1. The front rigid body 205 also includes an exit pupil 335 where the user's eye 340 is located. For purposes of illustration, FIG. 3 shows a cross section of the front rigid body 205 in accordance with a single eye 340. The local area 305 reflects incident ambient light as well as light projected by the illumination source 230, which is subsequently captured by the imaging device 225.

As described above in conjunction with FIG. 1, the electronic display 125 emits light forming an image toward the optics block 130, which alters the light received from the electronic display 125. The optics block 130 directs the altered image light to the exit pupil 335, which is a location of the front rigid body 205 where a user's eye 340 is positioned. FIG. 3 shows a cross section of the front rigid body 205 for a single eye 340 of the user, with another electronic display 125 and optics block 130, separate from those shown in FIG. 3, included in the front rigid body 205 to present content, such as an augmented representation of the local area 305 or virtual content, to another eye of the user.

As further described above in conjunction with FIG. 2, the illumination source 230 of the depth camera assembly (DCA) emits a series of periodic illumination patterns, with each periodic illumination pattern phase shifted by a different amount into the local area 305, and the imaging device 225 captures images of the periodic illumination patterns projected onto the local area 305 using a sensor comprising multiple pixels. Each pixel captures intensity of light emitted by the illumination source 230 from the local area 305 in various images and communicates the captured intensity to a controller or to the console 110, which determines a phase shift for each image, as further described below in conjunction with FIGS. 4-6B, and determines a depth of a location within the local area onto which the light emitted by the illumination source 230 captured by the imaging device 225 was captured, also further described below in conjunction with FIGS. 4-6B.

Depth Camera Assembly

FIG. 4 example of light emitted into a local area and captured by a depth camera assembly included in a head mounted display (HMD) 105. FIG. 4 shows an imaging device 225 and an illumination source 230 of a depth camera assembly (DCA) 120 included in the HMD. As shown in FIG. 4, imaging device 225 and the illumination source 230 are separated by a specific distance D (also referred to as a "baseline"), which is specified when the DCA 120 is assembled. The distance D between the imaging device 223 and the illumination source 230 is stored in a storage device coupled to the imaging device 225, coupled to a controller included in the DCA 120, or coupled to the console 110 in various embodiments.

In the example of FIG. 4, the illumination source 230 emits a smooth continuous intensity pattern of light 405 onto a flat target 410 within a local area surrounding the HMD 105 and within a field of view of the imaging device 225. The continuous intensity pattern of light 405 has a period T known to the DCA 120. However, in other embodiments, the illumination source 230 emits any suitable intensity pattern having a period T known to the DCA 120. Additionally, FIG. 4 identifies an angle $\theta_i$ that is one half of the period T of the continuous intensity pattern of light 405. As the continuous intensity pattern of light 405 scales laterally with the depth from the DCA 120, $\theta_i$ defines a depth independent periodicity of the illumination. Similarly, FIG. 4 depicts an angle $\theta_c$ and a line perpendicular to a plane including the imaging device 225 and a location on the target 410 from which a particular pixel of a sensor included in the imaging device 225 captures intensities of the continuous intensity pattern of light 405 in different images; hence, $\theta_c$ specifies an angle between the line perpendicular to the plane including the imaging device 225 and the location on the target 410 from which the specific pixel captures intensities of the continuous intensity pattern of light 405 emitted by the illumination source 230.

Each pixel of the sensor of the imaging device 225 provides an intensity of light from the continuous intensity pattern of light 405 captured in multiple images to a controller or to the console 110, which determines a phase shift, $\phi$, of the continuous intensity pattern of light 405 captured by each pixel of the sensor. Each image captured by the imaging device 225 is a digital sampling of the continuous intensity pattern of light 405, so the set of images captured by the sensor represent a Fourier transform of the continuous intensity pattern of light 405, and the Fourier components, $a_1$ and $b_1$, of the fundamental harmonic of the continuous intensity pattern 405 are directly related to the phase shift for a pixel of the sensor. For images captured by a pixel of the sensor, the Fourier components $a_1$ and $b_1$ are determined using the following equations:

$$a_1 = \sum_{n=1}^{N} S_n \cos(\theta_n) \Delta\theta \quad (1)$$

$$b_1 = \sum_{n=1}^{N} S_n \sin(\theta_n) \Delta\theta \quad (2)$$

In the preceding, $S_n$ denotes an intensity of the pixel of the sensor in a particular image, n, captured by the sensor, and the set $\theta n$ of represents the phase shifts introduced into the continuous intensity pattern of light 405. For example, if three phase shifts are used, the set of $\theta n$ includes 0 degrees, 120 degrees, and 240 degrees. As another example, if four phase shifts are used the set of $\theta n$ includes 0 degrees, 90 degrees, 180 degrees, and 270 degrees. In some embodiments, the set of $\theta n$ is determines so 0 degrees and 360 degrees are uniformly sampled by the captured images, but the set of $\theta n$ may include any values in different implementations.

From the Fourier components $a_1$ and $b_1$ determined as described above, the controller or the console determines the phase shift $\phi$ of the continuous intensity pattern of light 405 captured by a pixel of the sensor as follows:

$$\phi(R) = \tan^{-1}\left(\frac{a_1}{b_1}\right) - \theta_1 \quad (3)$$

$$R = \sqrt{a_1^2 + b_1^2} \quad (4)$$

In the preceding, $\phi$ is the phase shift of the first harmonic of the continuous intensity pattern of light 405, R is the magnitude of the first harmonic of the continuous intensity pattern of light 405, and $\theta_1$ is a calibration offset. For each spatial frequency of the continuous intensity pattern of light 405, the DCA 120 determines phase shifts using the intensity of the pixel of the sensor in at least three images.

The phase shift of the first harmonic of the continuous intensity pattern 405 determined through equation (3) above is used by a controller 430 coupled to the imaging device 225 and to the illumination source 230. In various embodiments the controller 430 is a processor that may be included in the imaging device 225, in the illumination source 230, or in the console 110 to determine the depth of the location of the target 410 from which the pixel of the sensor captures intensities of the continuous intensity pattern of light 405 as follows:

$$z = \frac{D}{\frac{\tan(\theta_i)}{\pi}(\phi_{ij} - \phi_{ij,cal}) - \tan(\theta_c)} \quad (5)$$

Where z is the depth of the location of the target 410 from which the pixel of the sensor captures intensities of the continuous intensity pattern of light 405; D is the distance between the illumination source 230 and the imaging device 225; $\theta_i$ is one half of the period T of the continuous intensity pattern of light 405; and $\theta_c$ is an angle between and a line perpendicular to a plane including the imaging device 225 and a the location on the target 410 from which a particular pixel located at row i and column j of the sensor included in the imaging device 225 captured intensities of the continuous intensity pattern of light 405. Additionally, $\phi_{ij}$ is the phase shift determined for the pixel at row i and column j of the sensor, determined as further described above. Further, $\phi_{ij,cal}$ is a calibration offset for the pixel of the sensor at row i and column j of the sensor, which is determined as further described below.

The DCA 120 determines phase shifts for each of at least a set of pixels of the sensor of the imaging device 225, as described above. For each of at least the set of pixels, the DCA 120 determines a depth from the DCA 120 to a location within the local area surrounding the DCA 120 from which a pixel of the set captured intensities of the continuous intensity pattern of light 405 emitted into the local area. This allows different pixels of the sensor of the imaging device 225 to determine depths of locations within the local area from which different pixels captured intensities of the continuous intensity pattern of light 405. In some embodiments, each pixel of the sensor of the imaging device 225 determines a depth from the DCA 120 to a location within the local area surrounding the DCA 120 from which a pixel captured intensities of the continuous intensity pattern of light 405 in various images. The DCA 120 may generate a depth map identifying depths from the DCA 120 to different locations within the local area from which different pixels captured intensities of the continuous intensity pattern of light 405. For example, the generated depth map identifies depths from the DCA 120 to different locations within the local area based on intensities captured by each pixel of the sensor, with a depth corresponding to a pixel of the sensor that captured intensities used to determine the depth.

However, because the phase shift is within a range of 0 and a $2\pi$ radians, there may be ambiguities in resolving phase shifts that are integer multiples of a $2\pi$ when determining the phase shift as described above. To avoid these potential ambiguities, in some embodiments, the continuous intensity pattern of light 405 emitted by the illumination source 230 as a single, relatively lower, spatial frequency; however, use of a relatively lower spatial frequency may decrease precision of the depth determination by the DCA 120. Alternatively, the continuous intensity pattern of light 405 includes two or more spatial frequencies in sequence. Using two or more spatial frequencies increases a range of phases within which phase shifts may be unambiguously identified. The range of phases is extended for a subset of pixels within the sensor of the imaging device 225 based on a maximum parallax expected during operation of the imaging device 225, which may be determined based on a difference between a maximum range and a minimum range of the imaging device 225. Hence, the range of phases is extended for the subset of pixels of the sensor most likely to capture light from the continuous intensity pattern of light 405.

FIG. 5 shows an example of using two frequencies of a continuous intensity pattern of light emitted by a DCA 120 to identify a phase shift for a pixel of the sensor. In the example of FIG. 5, phase shifts identified from frequency 505 repeat through the interval of 0 and $2\pi$ radians three times in a time interval, while phase shifts identified from frequency 510 repeat through the interval of 0 and $2\pi$ radians twice in the time interval, as shown in plot 520. Hence, emitting light patterns having frequency 505 and frequency 510 allows the DCA 120 to identify a phase shift in the time interval over a larger interval than between 0 and $2\pi$ (i.e., "unwraps" the phase shifts that may be unambiguously identified). FIG. 5 shows another example where, phase shifts identified from frequency 505 repeat through the interval of 0 and $2\pi$ radians five times in a time interval, while phase shifts identified from frequency 515 repeat through the interval of 0 and $2\pi$ radians twice in the time interval, as shown in plot 530. This similarly allows the DCA 120 to identify a phase shift in the time interval over a larger interval than between 0 and $2\pi$ (i.e., "unwraps" the phase shifts that may be unambiguously identified). Additionally, FIG. 5 also shows an analogous three dimensional plot 540 of frequency 505, frequency 510, and frequency 515, which may further extend the range of phases over which phase shifts may be unambiguously identified. In other embodiments, any number of frequencies of the continuous intensity pattern of light may be used to identify the phase shift for the pixel of the sensor using the process further described above.

Depth Camera Assembly Calibration

Referring again to FIG. 4, a pixel of the sensor of the imaging device 225 captures intensity of the continuous intensity pattern of light 405 at a position of $D+x_0$ relative to the illumination source 230, where $x_0$ is a distance from a principal point of the imaging device 225 along an axis separating the illumination source 230 and the sensor (e.g., along a horizontal axis along which the illumination source 230 and the sensor are positioned). As further described above in conjunction with FIG. 4, the position of the pixel along the axis separating the illumination source 230 and the sensor is related to the phase shift, $\phi_{ij}$, determined for the pixel. Additionally, as further described above $\theta i$ defines the spatial periodicity of the continuous intensity pattern of light 405 in the local area and corresponds to half of the period T of the continuous intensity pattern of light. As the continuous intensity pattern of light 405 expands angularly as depth z from the DCA 120 increases, the period T of the continuous intensity pattern of light 405 corresponds to a specific depth z from the DCA 120, while the periodicity defined by $\theta i$ is independent of depth z from the DCA 120. The dependence of the period T of the continuous intensity pattern of light 405, in combination with the distance D between the imaging device 225 and the illumination source 230 allows the DCA 120 to determine the depth z of an object onto which the continuous intensity pattern of light 405 is emitted, as the lateral distance at which the pixel captures a phase, $D+x_0$, is equal to a product of the period T of the continuous intensity pattern of light 405 captured by the imaging device 225 and a ratio of the phase shift, $\phi_{ij}$, determined for the pixel to $2\pi$ (i.e., $D+x_0=T(\phi_{ij}/2\pi)$). This relationship between the depth-dependent period T, the distance from a principal point of the imaging device 225, and phase shift, $\phi_{ij}$, determined for the pixel equates a an estimate of lateral extent at the camera plane and the plane including the object onto which the continuous intensity pattern of light 405 was emitted, which both measure a distance from a center of the continuous intensity pattern of light 405 to a central ray of the pixel.

The continuous intensity pattern of light 405 may be calibrated or determined using any suitable method, and scales with depth from the DCA 120. Accordingly, the period T of the continuous intensity pattern of light 405 at the depth z from the DCA 120 is equal to double a product of the depth z form the DCA 120 and a tangent of the angle, $\theta_i$, which defines half of the period T of the continuous intensity pattern of light (i.e., $T=(2)(z)(\tan(\theta_i))$). Similarly, the location of the pixel relative to the illumination source 230 along an axis separating the illumination source 230 and the sensor, $x_0$, is a product of the depth from the DCA 120, z. and a tangent of the angle, $\theta c$, between the line perpendicular to the plane including the imaging device 225 and the location on the target 410 from which the specific pixel captures intensities of the continuous intensity pattern of light 405 emitted by the illumination source 230 (i.e., $x_0=z(\tan(\theta_c))$). Accordingly, $$D + z(\tan\theta_c) = 2z(\tan\theta_i)\left(\frac{\phi_{ij}}{2\pi}\right) \quad (6)$$

Solving equation 6 above for depth, z:

$$z = \frac{D}{\frac{\tan\theta_i}{\pi}\phi_{ij} - \tan\theta_c} \quad (7)$$

However, equation 7 above is based on the phase shift, $\phi_{ij}$, when the location. $x_0$, of the pixel relative to the illumination source 230 along equals the inverse of the specific distance D separating the imaging device 225 and the illumination source 230 is zero (i.e., $\phi_{ij}(x_0=D)=0$). To satisfy this condition, a calibration offset, $\phi_{ij,cal}$, is determined for each pixel via a calibration process where the sensor of the imaging device 225 captures intensities from the continuous illumination pattern of light 405 emitted onto a target at an accurately predetermined depth, $z_{cal}$. In various embodiments, the target is a Lambertian surface or other surface that reflects at least a threshold amount of light incident on the target. Accounting for the calibration offset modifies equation (7) above into equation (5), $$z = \frac{D}{\frac{\tan(\theta_i)}{\pi}(\phi_{ij} - \phi_{ij,cal}) - \tan(\theta_c)},$$

which was previously described above in conjunction with FIG. 4. With the predetermined depth, $z_{cal}$, the calibration offset for each pixel is determined as:

$$\phi_{ij,cal} = \phi_{ij} - \frac{\pi}{\tan\theta_i}\left[\frac{D}{z_{cal}} + \tan\theta_c\right] \quad (8)$$

The calibration offset is determined for each pixel of the sensor and for each frequency of the continuous intensity pattern of light 405 based on the predetermined depth $z_{cal}$ and is stored in the DCA 120 for use during operation. A calibration offset for each pixel of the sensor is determined for each period of continuous intensity pattern of light 405 emitted by the illumination source 230 and stored during the calibration process. For example, the DCA 120 stores a calibration offset for a pixel of the sensor in association with a location (e.g., a row and a column) of the pixel within the sensor and in association with a frequency of the continuous intensity pattern of light 405. In various embodiments, the DCA 120 stores a parameterized function for determining the calibration offset of different pixels of the sensor based on location within the sensor and frequency of the continuous intensity pattern of light 405 instead of storing calibration offsets determined for individual pixels of the sensor. The DCA 120 stores a parameterized function corresponding to each period T of continuous intensity patterns of light 405 emitted by the illumination source 230 in various embodiments. In some embodiments, the parameterized function determining the calibration offset of different pixels is a linear function.

In embodiments where the illumination source 230 includes an acousto-optic modulator configured to generate two Gaussian beams of light that interfere with each other in the local area so a sinusoidal interference pattern is generated as the continuous intensity pattern of light 405 emitted into the local area, the period T of the continuous intensity pattern of light 405 is determined as:

$$\frac{T}{2} = \frac{z}{\sqrt{\left(\frac{2a}{\lambda}\right)^2 - 1}} \quad (9)$$

In equation 9, $\lambda$ is a wavelength of the illumination source 230 and a is the separation of the Gaussian beams generated by the acousto-optic modulator to generate the continuous intensity pattern of light 405 emitted into the local area surrounding the DCA 120. The determined period T may then be used to determine the calibration offset for various pixels of the detector, as further described above.

Imaging Device Sensor

Figure 6A:
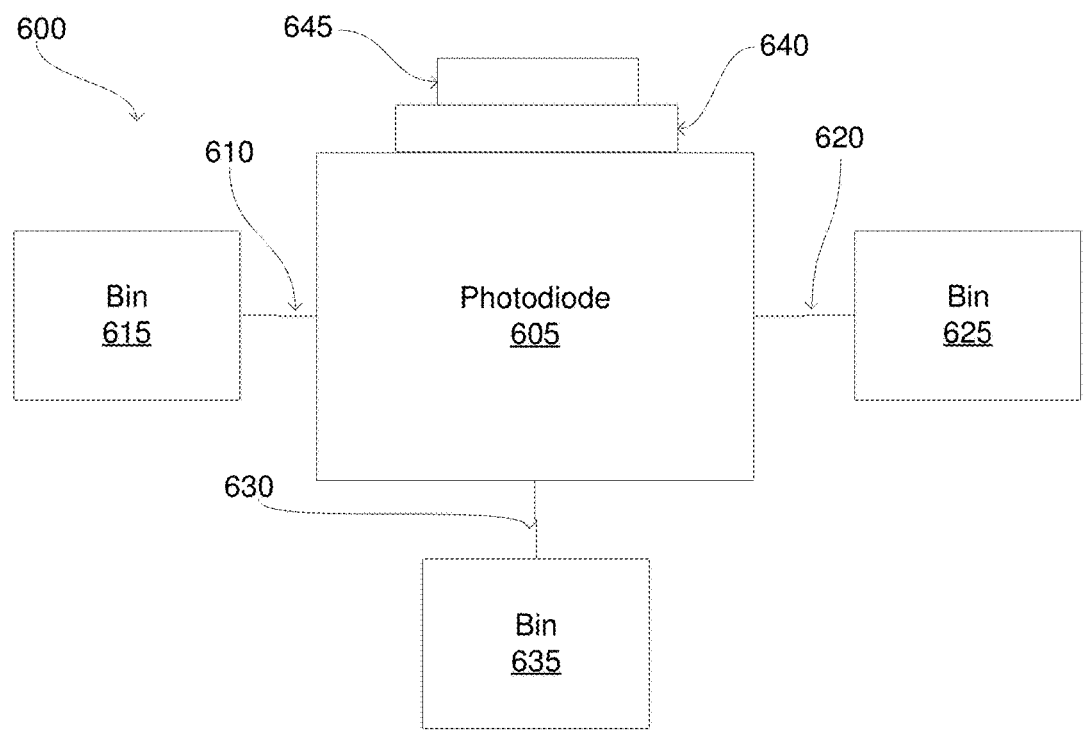
FIG. 6A is an example pixel of a sensor included in an imaging device of a depth camera assembly, in accordance with an embodiment.

FIG. 6A shows an example pixel 600 of a sensor included in an imaging device 225 of a depth camera assembly (DCA) 120. In the example of FIG. 6, the pixel 600 includes a photodiode 605 coupled to multiple charge storage bins 615, 625, 635. While FIG. 6A shows three charge storage bins 615, 625, 635 coupled to the photodiode 605, in other embodiments, the pixel 600 is coupled to more than three charge storage bins 615, 625, 635. The photodiode 605 is coupled to charge storage bin 615 via transfer gate 610, coupled to charge storage bin 625 via transfer gate 620, and coupled to charge storage bin 635 via transfer gate 630.

A controller is coupled to the illumination source 230 of the DCA 120, which is further described above in conjunction with FIG. 4, and also to the sensor of the imaging device 225. The controller provides control signals to transfer gate 610, transfer gate 620, and transfer 630 based on times when the illumination source 230 emits a periodic illumination pattern. In various embodiments, the illumination source 230 is activated to emit a periodic illumination pattern, is deactivated, and is activated again to emit another periodic illumination pattern. When the illumination source 230 is deactivated, the controller communicates control signals to transfer gate 610, transfer gate 620, and transfer gate 630. The control signals cause a single transfer gate 610, 620, 630 to open, while the other transfer gates 610, 620, 630 remain closed, so charge accumulated by the photodiode 605 while the illumination source 230 was activated is transferred to the charge storage bin 615, 625, 635 coupled to the photodiode via the open single transfer gate 610, 620, 630. The open transfer gate 610, 620, 630 is closed when the illumination source 230 is again activated, and control signals from the controller open another transfer gate 610, 620, 630, so charge accumulated by the photodiode 605 while the illumination source 230 was active is transferred to a charge storage bin 615, 625, 635 via the open transfer gate 610, 620, 630.

Figure 6B:
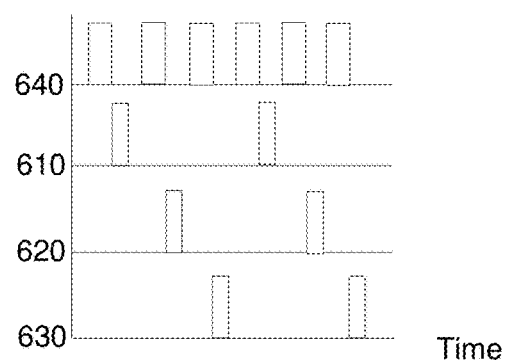
FIG. 6B is an example of control signals operating the example pixel shown in FIG. 6A, in accordance with an embodiment.

FIG. 6B is one example of control signals regulating operation of the pixel 600 shown in FIG. 6A. For purposes of illustration, FIG. 6B identifies a signal 640 indicating times when the illumination source 230 emits a periodic illumination pattern. When the signal 640 has a maximum value in FIG. 6B, the illumination source 230 emits a periodic illumination pattern. FIG. 6B also shows control signals provided to transfer gate 610, transfer gate 620, and transfer gate 630. In the example of FIG. 6B, when a control signal provided to a transfer gate 610, 620, 630 has a maximum value, the transfer gate 610, 620, 630 receiving the control signal is open; when the control signal provided to a transfer gate 610, 620, 630 has a minimum value, the transfer gate 610, 620, 630 is closed.

In the example of FIG. 6B, when the illumination source 230 is initially activated and emits a periodic illumination pattern, transfer gate 610, transfer gate 620, and transfer gate 630 are closed. When the illumination source 230 is deactivated and stops emitting the periodic illumination pattern, transfer gate 610 receives a control signal that opens transfer gate 610, while transfer gate 620 and transfer gate 630 remain closed. Charge accumulated by the photodiode 605 while the illumination source 230 was activated is transferred into charge storage bin 615 via transfer gate 610. The control signal closes transfer gate 610 before the illumination source 230 is activated again, and the photodiode 605 accumulates charge from light captured while the illumination source 230 is activated. When the illumination source 230 is deactivated, transfer gate 620 receives a control signal that opens transfer gate 620, while transfer gate 610 and transfer gate 630 remain closed; hence, charge accumulated by the photodiode 605 is transferred to charge storage bin 625. The control signal closes transfer gate 620 before the illumination source 230 is activated, and the photodiode 605 accumulates charge from light captured while the illumination source 230 is activated. When the illumination source 230 is again deactivated, transfer gate 630 receives a control signal that opens transfer gate 630, while transfer gate 610 and transfer gate 620 remain closed. Accordingly, charge accumulated by the photodiode 605 is transferred to charge storage bin 635. Transfer gate 630 closes before the illumination source 230 is again activated, and the control signals received by transfer gate 610, transfer gate 620, and transfer gate 630 open and close the transfer gates 610, 620, 630 as described above while the illumination source 230 is activated and deactivated.

In some embodiments, the controller determines a signal to noise ratio from the charge is accumulated in charge storage bins 615, 625, 635 and compares the determined signal to noise ratio to a threshold. If the determined signal to noise ratio is less than the threshold, the controller provides control signals to open and close transfer gates 610, 620, 630, as further described above, until the signal to noise ratio determined from the charge accumulated in charge storage bins 615, 625, 635 equals or exceeds the threshold. If the determined signal to noise ratio equals or exceeds the threshold, the controller combines the charge stored in each of charge storage bin 615, 625, 635 to determine an intensity of light from the illumination source 230 captured by the pixel 600 and determines a depth of a location within the local area surrounding the DCA 120 from which the pixel 600 captured light form the illumination source 230, as further described above in conjunction with FIGS. 4 and 5. Accumulating charge in a single charge storage bin 615, 625, 635 coupled to the photodiode 605 by an open transfer gate 610, 620, 630 limits accumulation of background noise caused by the photodiode 605 capturing light from sources other than the illumination source 230, allowing the pixel 600 to have a higher signal to noise ratio than other techniques. Additionally, accumulating charge from the photodiode 605 in different charge storage bins 615, 625, 635 allows the pixel to multiplex phase shift determinations for the periodic illumination pattern captured by the pixel 600, which reduces the number of images for the image capture device 225 to capture to determine the phase shift of the periodic illumination pattern captured by the pixel 600 and reduces an amount of time the pixel 600 captures light emitted from the illumination source.

Referring back to FIG. 6A, the pixel 600 also includes a drain 640 coupled to the photodiode 605 via a shutter 645. When the illumination source 230 is deactivated, the controller provides a control signal to the shutter 645 that causes the shutter 645 to open and couple the photodiode 605 to the drain 640. Coupling the photodiode 605 to the drain 640 while the illumination source is deactivated discharges charge produced by the photodiode 605 from ambient light in the local area surrounding the DCA 120. When the illumination source 230 is activated, the controller provides an alternative control signal to the shutter 645 that closes the shutter 645 to decouple the photodiode 605 from the drain 640. Additionally, the shutter 645 may be configured to open if a charge accumulated by the photodiode 605 from captured light equals or exceeds a threshold value, allowing charge accumulated by the photodiode 605 to be removed via the drain 604, preventing the photodiode 605 from saturating and preventing charge accumulated by the photodiode 605 from being transferred into adjacent pixels 600. The shutter 645 is configured to couple the photodiode 605 to the drain 640 until the charge accumulated by the photodiode 605 is less than the threshold or is at least a threshold amount below the threshold in some embodiments.

However, in other embodiments, different control signals regulate operation of the pixel 600 shown in FIG. 6A. For example, the illumination source 230 is activated and remains activated, while different transfer gates 610, 620, 630 are activated at different times, so charge is accumulated in different bins 615, 625, 635 at different times. For example, during a time interval, the illumination source 230 remains activated and emitting the periodic illumination pattern, and control signals alternately activate transfer gates 610, 620, 630 during different time periods, so charge accumulated by the photodiode 605 is alternately transferred into bins 615, 625, 635, respectively, during the time interval. As an example, during a first time period while the illumination source 230 is activated, transfer gate 610 is activated and transfer gates 620, 630 are closed, so charge accumulated by the photodiode 605 is transferred into bin 615. During a second time period while the illumination source 230 remains activated, transfer gate 620 is activated and transfer gates 610, 630 are closed, so charge accumulated by the photodiode 605 is transferred into bin 625. Similarly, During a third time period while the illumination source 230 remains activated, transfer gate 630 is activated and transfer gates 610, 620 are closed, so charge accumulated by the photodiode 605 is transferred into bin 635. The different transfer gates 610, 620, 630 may alternately be activated as described above during a time interval while the illumination source 230 is emitting the periodic illumination pattern.

In other embodiments, relative timing between control signals activating the illumination source 230 and controls activating transfer gates 610, 620, 630 may differ. For example, a control signal activates a transfer gate 610, 620, 630 so the transfer gate 610, 620, 630 is active for at least a portion of a time while the illumination source 230 is active and emitting the periodic illumination pattern. As another example, control signals activating a transfer gate 610, 620, 630 are received by a transfer gate 610, 620, 630 after the illumination source 230 has been deactivated for a specific amount of time, adding a delay between deactivation of the illumination source 230 and activation of a transfer gate 610, 620, 630. However, the preceding are merely examples, and the pixel 600 may be operated in any suitable manner in different embodiments.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
an illumination source configured to emit light comprising a series of periodic illumination patterns into a local area surrounding the illumination source, each periodic illumination pattern having a different phase shift;
a sensor separated from the illumination source by a specific distance, the sensor including a plurality of pixels, each pixel comprising:
a photodiode configured to accumulate charge based on light from the local area illuminating the photodiode; and
a plurality of charge storage bins coupled to the photodiode, each charge storage bin coupled to the photodiode by a transfer gate; and
a controller coupled to the sensor, the controller configured to communicate control signals to the sensor, a control signal opening a specific transfer gate coupling the photodiode of a pixel to a specific charge storage bin.

2. The system of claim 1, wherein the controller is coupled to the illumination source and is further configured to:
determine the illumination source is emitting a periodic illumination pattern during a time interval;
determine the illumination source stopped emitting the periodic illumination pattern during the time interval;
communicate a control signal to the sensor opening the specific transfer gate to couple the photodiode of the pixel to the specific charge storage bin while other transfer gates coupled to the photodiode of the pixel remain closed in response to determining the illumination source stopped emitting the periodic illumination pattern during the time interval.

3. The system of claim 2, wherein the controller is further configured to:
determine the illumination source is emitting the periodic illumination pattern during an additional time interval;
determine the illumination source stopped emitting the periodic illumination pattern during the additional time interval;
communicate an additional control signal to the sensor opening an additional transfer gate to couple the photodiode of the pixel to an additional charge storage bin while the specific transfer gate and other transfer gates coupled to the photodiode of the pixel remain closed in response to determining the illumination source stopped emitting the periodic illumination pattern during the additional time interval.

4. The system of claim 3, wherein the controller is further configured to:
determine the illumination source is emitting the periodic illumination pattern during an alternative time interval;
determine the illumination source stopped emitting the periodic illumination pattern during the alternative time interval;
communicate an alternative control signal to the sensor opening an alternative transfer gate to couple the photodiode of the pixel to an alternative charge storage bin while the specific transfer gate, the additional transfer gate, and other transfer gates coupled to the photodiode of the pixel remain closed in response to determining the illumination source stopped emitting the periodic illumination pattern during the alternative time interval.

5. The system of claim 1, wherein the controller is further configured to:
combine charge accumulated in each of the plurality of charge storage bins coupled to the photodiodes.

6. The system of claim 1, wherein the controller is configured to communicate control signals to the sensor opening different transfer gates at different times while the illumination source emits a periodic illumination pattern.

7. The system of claim 1, wherein each pixel further comprises:
a drain coupled to the photodiode by a shutter.

8. The system of claim 7, wherein the controller is coupled to the illumination source and configured to provide a signal to the sensor opening the shutter for charge accumulated by the photodiode to be directed to the drain in response to the controller determining the illumination source is deactivated.

9. The system of claim 7, wherein the shutter is configured to open for charge accumulated by the photodiode to be directed to the drain in response to determining an amount of charge accumulated by the photodiode equals or exceeds a threshold.

10. The system of claim 9, wherein the shutter is further configured to close in response to determining the amount of charge accumulated by the photodiode is less than the threshold.

11. An apparatus comprising:
a sensor including a plurality of pixels, each pixel comprising:
a photodiode configured to accumulate charge based on light from the local area illuminating the photodiode; and
a plurality of charge storage bins coupled to the photodiode, each charge storage bin coupled to the photodiode by a transfer gate; and
a controller coupled to the sensor, the controller configured to communicate control signals to the sensor, a control signal opening a specific transfer gate coupling the photodiode of a pixel to a specific charge storage bin by determining an illumination source is emitting a periodic illumination pattern during a time interval, determining the illumination source stopped emitting the periodic illumination pattern during the time interval, and communicating a control signal to the sensor opening the specific transfer gate to couple the photodiode of the pixel to the specific charge storage bin while other transfer gates coupled to the photodiode of the pixel remain closed in response to determining the illumination source stopped emitting the periodic illumination pattern during the time interval.

12. The apparatus of claim 11, wherein the controller is further configured to:
determine the illumination source is emitting the periodic illumination pattern during an additional time interval;
determine the illumination source stopped emitting the periodic illumination pattern during the additional time interval;
communicate an additional control signal to the sensor opening an additional transfer gate to couple the photodiode of the pixel to an additional charge storage bin while the specific transfer gate and other transfer gates coupled to the photodiode of the pixel remain closed in response to determining the illumination source stopped emitting the periodic illumination pattern during the additional time interval.

13. The apparatus of claim 12, wherein the controller is further configured to:
   determine the illumination source is emitting the periodic illumination pattern during an alternative time interval;
   determine the illumination source stopped emitting the periodic illumination pattern during the alternative time interval;
   communicate an alternative control signal to the sensor opening an alternative transfer gate to couple the photodiode of the pixel to an alternative charge storage bin while the specific transfer gate, the additional transfer gate, and other transfer gates coupled to the photodiode of the pixel remain closed in response to determining the illumination source stopped emitting the periodic illumination pattern during the alternative time interval.

14. The apparatus of claim 11, wherein the controller is further configured to:
   combine charge accumulated in each of the plurality of charge storage bins coupled to the photodiodes.

15. The apparatus of claim 14, wherein combine charge accumulated in the specific charge storage bin, the additional charge storage bin, and the alternative charge storage bin comprises:
   determine a signal to noise ratio of charge accumulated in the specific charge storage bin, the additional charge storage bin, and the alternative charge storage bin; and
   combine the charge accumulated in the specific charge storage bin, the additional charge storage bin, and the alternative charge storage bin in response to the signal to noise ratio equaling or exceeding a threshold.

16. The apparatus of claim 11, wherein each pixel further comprises:
   a drain coupled to the photodiode by a shutter.

17. The apparatus of claim 16, wherein the controller is coupled to the illumination source and configured to provide a signal to the sensor opening the shutter for charge accumulated by the photodiode to be directed to the drain in response to the controller determining the illumination source is deactivated.

18. The apparatus of claim 16, wherein the shutter is configured to open for charge accumulated by the photodiode to be directed to the drain in response to determining an amount of charge accumulated by the photodiode equals or exceeds a threshold.

19. The apparatus of claim 18, wherein the shutter is further configured to close in response to determining the amount of charge accumulated by the photodiode is less than the threshold.

* * * * *